(12) United States Patent
Finkenbiner-Pepper et al.

(10) Patent No.: US 10,140,946 B2
(45) Date of Patent: Nov. 27, 2018

(54) DISPLAY ASSEMBLY WITH MULTIPLE FLAT LENSES WITH OPTICAL ADHESIVES TO GENERATE A NON-LINEAR SURFACE

(71) Applicants: Debra A. Finkenbiner-Pepper, Canton, MI (US); Robert Edward Belke, West Bloomfield, MI (US); Theodore Charles Wingrove, Plymouth, MI (US); James Joseph Kornacki, Dearborn, MI (US); Michael Eichbrecht, Farmington Hills, MI (US); Kyle Entsminger, Canton, MI (US); Andrew DeScisciolo, Canton, MI (US)

(72) Inventors: Debra A. Finkenbiner-Pepper, Canton, MI (US); Robert Edward Belke, West Bloomfield, MI (US); Theodore Charles Wingrove, Plymouth, MI (US); James Joseph Kornacki, Dearborn, MI (US); Michael Eichbrecht, Farmington Hills, MI (US); Kyle Entsminger, Canton, MI (US); Andrew DeScisciolo, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/976,657

(22) Filed: Dec. 21, 2015

(65) Prior Publication Data

US 2017/0178589 A1    Jun. 22, 2017

(51) Int. Cl.
*G09G 5/00* (2006.01)
*G02B 7/00* (2006.01)
*G02B 7/02* (2006.01)
*G02F 1/1333* (2006.01)

(Continued)

(52) U.S. Cl.
CPC .......... *G09G 5/003* (2013.01); *G02B 7/003* (2013.01); *G02B 7/025* (2013.01); *G02F 1/13336* (2013.01); *G02F 1/133526* (2013.01); *G06F 3/1446* (2013.01); *G09G 2300/026* (2013.01)

(58) Field of Classification Search
CPC ........ G09G 3/001; G09G 3/007; G09G 3/002; G09G 3/2096; G09G 5/003; G09G 2300/026; G09G 2356/00; G09G 2360/06; G09G 2380/10; G02B 3/0075; G02B 7/003; G02B 7/021; G02B 7/025; G02B 27/1066; G03B 21/13; G02F 1/13336; G02F 1/133526; H04N 13/0488; G06F 1/1601;

(Continued)

(56) References Cited

U.S. PATENT DOCUMENTS

| 8,576,370 | B1 * | 11/2013 | Sampica | ........ G02F 1/1335 349/155 |
| 8,920,592 | B2 | 12/2014 | Suwa et al. | |
| 8,979,294 | B2 | 3/2015 | An et al. | |

(Continued)

*Primary Examiner* — Keith Crawley
(74) *Attorney, Agent, or Firm* — Quinn IP Law

(57) ABSTRACT

A method, system, and display assembly is disclosed herein. The aspects disclosed herein include the providing of at least two lenses covering a respective display, with the two lenses bonded together with an optical clear adhesive. The optical clear adhesive may be shaped in a predetermined manner, such as a curve. Also included herein are systems for driving electronic signals to the respective displays. The signals may undergo processing in order to provide a seamless look via the display assembly.

12 Claims, 5 Drawing Sheets

(51) Int. Cl.
*G06F 3/14* (2006.01)
*G02F 1/1335* (2006.01)

(58) Field of Classification Search
CPC .... G06F 1/1609; G06F 1/1639; G06F 1/1647; G06F 3/1446
See application file for complete search history.

(56) References Cited

U.S. PATENT DOCUMENTS

| | | | | |
|---|---|---|---|---|
| 2004/0051451 A1* | 3/2004 | Kawase | ............. | H01L 27/3293 313/512 |
| 2004/0051944 A1* | 3/2004 | Stark | .................. | G02F 1/13336 359/448 |
| 2005/0083331 A1* | 4/2005 | MacKinlay | ........... | G06F 3/1446 345/473 |
| 2006/0077544 A1* | 4/2006 | Stark | .................... | G02F 1/13336 359/448 |
| 2009/0106689 A1* | 4/2009 | Miller | ..................... | G06T 5/006 715/788 |
| 2009/0122415 A1* | 5/2009 | Mitani | ................ | G02F 1/13336 359/639 |
| 2010/0073641 A1 | 3/2010 | Han et al. | | |
| 2010/0177017 A1* | 7/2010 | Zeng | ..................... | G06F 3/1431 345/1.1 |
| 2011/0134150 A1* | 6/2011 | Imamura | .................. | G09G 3/20 345/690 |
| 2011/0242686 A1* | 10/2011 | Watanabe | .......... | G02B 17/0884 359/804 |
| 2013/0162504 A1* | 6/2013 | Kawano | ................ | G06F 3/1446 345/1.3 |
| 2015/0109283 A1* | 4/2015 | Gates | .................... | G09G 3/344 345/212 |
| 2015/0286457 A1* | 10/2015 | Kim | ...................... | G06F 3/1446 345/581 |

* cited by examiner

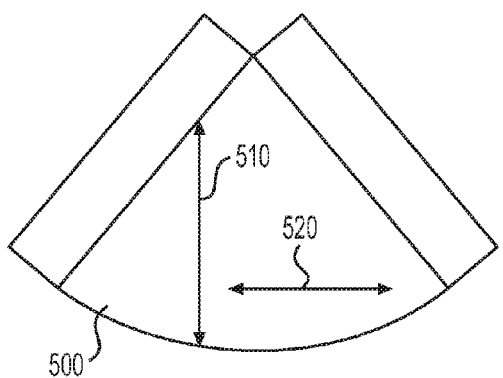
FIG. 5
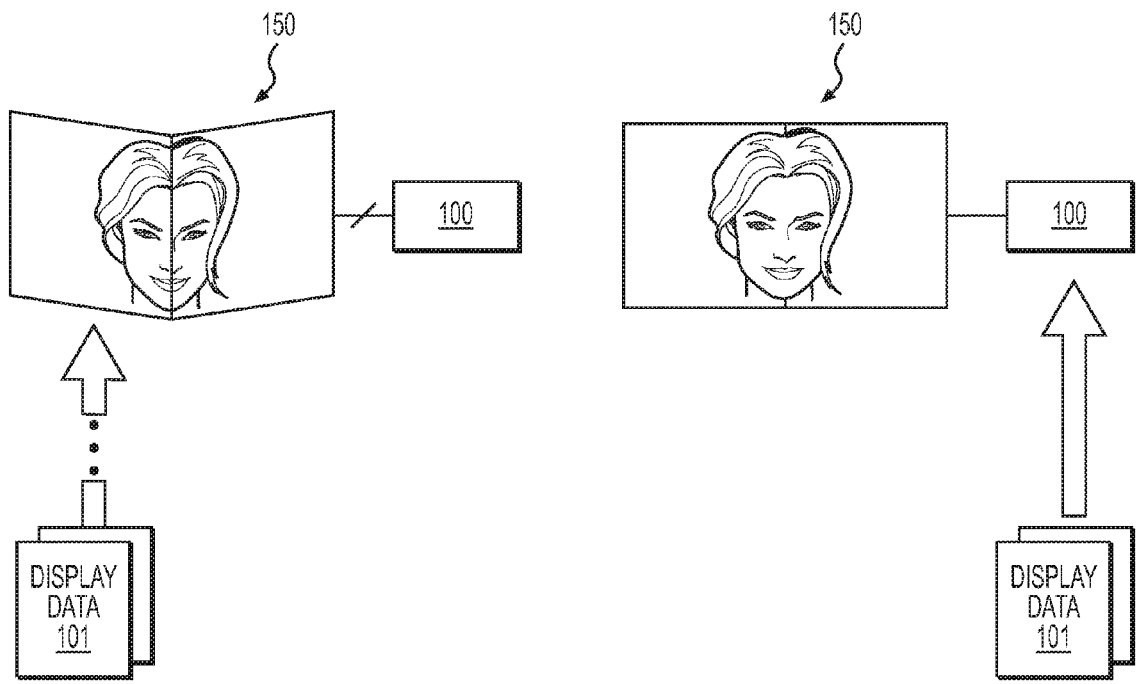
FIG. 6A  FIG. 6B

DISPLAY ASSEMBLY WITH MULTIPLE FLAT LENSES WITH OPTICAL ADHESIVES TO GENERATE A NON-LINEAR SURFACE

BACKGROUND

Displays are employed to convey digital information via a lighted platform. The displays are installed in a variety of contexts and environments, such as televisions, advertisements, personal computing devices, and more commonly, in vehicles.

The standard display assembly includes display driving logic with various instructions as to the patterns to communicate to an array of lighting elements. The display driving logic communicates signals that instruct which of the lighting elements to light up, and a corresponding intensity and color (if available). The display assembly may be incorporated with various interface devices, such as keyboards, pointers, gaze trackers, head trackers, eye trackers, touch screens, and the like.

The displays are usually cased with transparent substances, such as lenses, that allow light being illuminated to be projected to the viewer's eyes. The lens faces the viewers, and thus, implementers provide different shapes, sizes, and types based on an implementers preference. Further, different locations and such may necessitate the lens to be a specific type and shape.

In recent years, different curved lens have been introduced. The curved lens allow for a non-linear and tapered surface to be provided to the viewer. Thus, by having a non-linear presentation, the implementer of a display assembly may effectively provide a secondary type of display to the viewer.

SUMMARY

The following description relates to a display assembly, a system for driving electrical signals to the display assembly, and a method of manufacturing the display assembly.

A display assembly is disclosed herein. The display assembly includes a first lens connected to a first display driver; a second lens connected to a second display driver, the second lens forming an angle with the first lens; and an adhesive layer applied to first lens and the second lens.

In another example, the display assembly further includes a first display driver and a second display driver electrically coupled to a source, the source being configured to generate display data via both the first display driver and the second display driver.

In another example, the display data is further configured to be split into a first portion communicated to the first display driver, and a second portion communicated to the second display driver.

In another example, the adhesive layer is an optically clear adhesive (OCA).

In another example, the OCA is a liquid optical clear adhesive.

In another example, the OCA is a provided with a predefined shape.

In another example, the predefined shape is a curve.
In another example, the predefined shape is a convex.
In another example, the predefined shape is concave.
In another example, the first lens and the second lens are rectangular and flat.

The system for driving a display assembly with multiple lenses, each of the multiple lenses covering a respective display device is described herein. The system includes a display data receiver configured to receive data from an electronic source; an image separator configured to separate the received data for each of the respective multiple lenses; a formula adjuster configured to adjust a property associated with each of the separated received data to produce image data for each of the respective display devices based on its respective covered lens.

In another example, the multiple lenses of the system include a first lens and a second lens, and the formula adjuster adjusts each of the separated received data to adjust for an angle formed by the first lens and the second lens.

In another example, the multiple lenses of the system includes a first lens and a second lens, and the formula adjuster adjusts each of the separated received data to adjust for an adhesive layer covering the first lens and the second lens.

In another example, the multiple lenses of the system includes a first lens and a second lens, and the formula adjuster adjusts each of the separated received data based on a specific pixel, the specific pixel's location on the display associated with the first lens, and its distance from the second display.

A method for providing a seamless display with multiple lenses, each of the multiple lenses being associated with a respective display is described herein. The method includes providing a first lens associated with a first display; providing a second lens associated with a second display; orientating the first lens and the second with each other; and providing an adhesive layer on both the first lens and the second lens.

In another example of the method, the adhesive layer has a predetermined shape on a surface opposing a viewer of the seamless display.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 5 illustrates various elements of a display assembly which may be used in the method in FIG. 4.

FIGS. 6(a) and (b) illustrate an example of the display assembly implemented with and without the system of FIG. 1, respectively.

DETAILED DESCRIPTION

Figure 1:
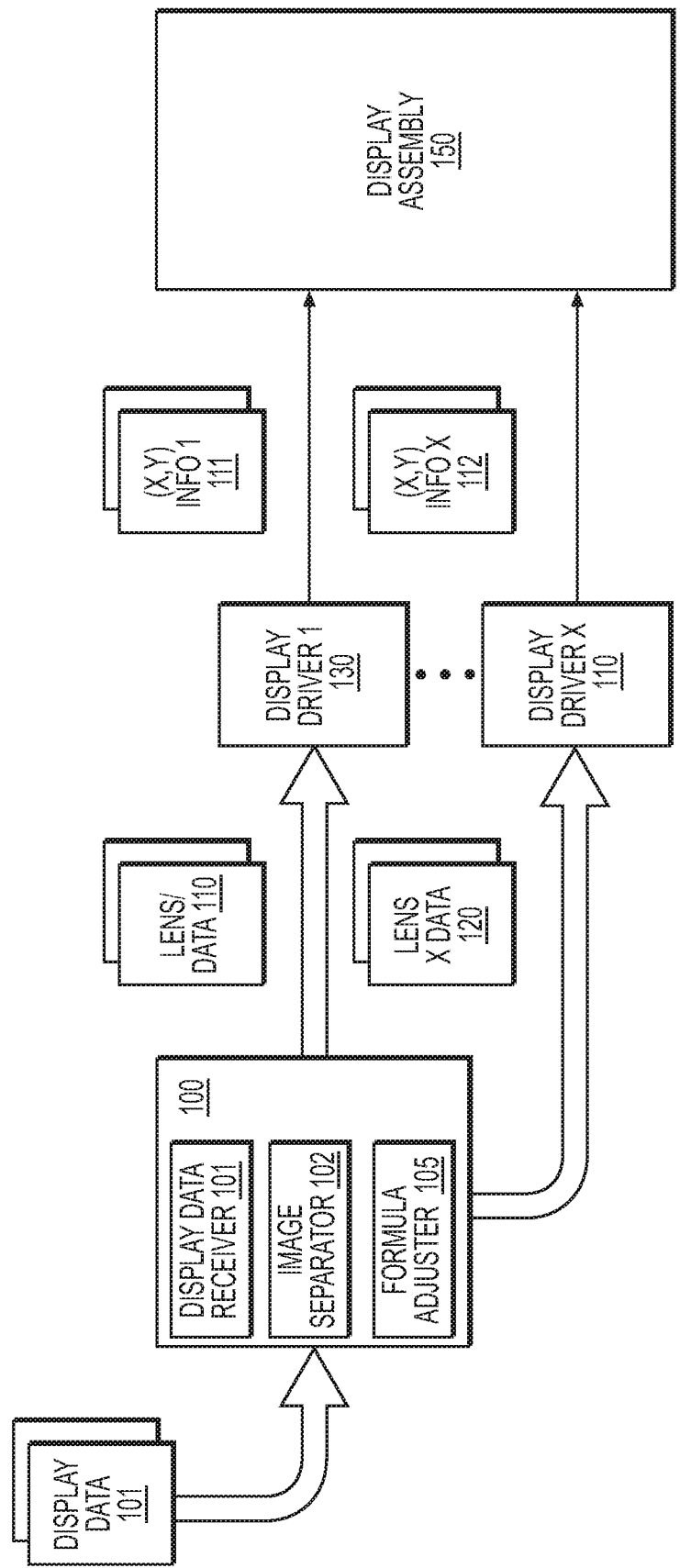
FIG. 1 illustrates an example of system for displaying content via a display assembly according to an exemplary embodiment.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

The providing of a curved lens for a display assembly is become increasingly sought after for a variety of design reasons. As explained in the Background, curved lens suit a variety of applications based on need and aesthetic reasons. However, many manufacturers have faced difficulties in providing a curved lens in a cost-effective and easy to produce manner.

Current technologies require machining curved lens structures that fit specific applications. However, because the curved lens has to be produced at a specific instance and/or manufacturing process, the introduction of curved lens manufacturing may be difficult. Further, other components associated with the display assembly would also have to be re-manufactured and tooled to work effectively with the newly designed curved lens. Thus, providing a cost effective manner of delivering a curved display assembly employing existing lens technologies does not currently exist.

Disclosed herein are methods, systems and display assemblies for providing a curved lens structure. Employing the aspects disclosed herein, a manufacturer may effectively provide a curved lens appearance while using planar conventional lenses. The aspects disclosed herein also entail providing systems and methods for adjusting a display based on the curved lens implementation discussed herein.

FIG. 1 illustrates an example of system 100 for displaying content via a display assembly 150. The system 100 is exemplary and may be implemented with the various lenses/display assemblies disclosed herein. The system 100 includes a display data receiver 101, an image separator 102, and a formula adjustor 105

As shown, display data 101 is received from any known source for generating image based data via the display data receiver 101. For example, various electronic programs employ graphical user interface (GUI)s to convey digital information. The information may be propagated by display data 101 and communicated to system 100.

The display data 101 is separated, via the image separator, for each of the multiple displays associated with the display assembly 150. As explained below, the display assembly 150 may compose multiple lenses/displays to form a singular display.

Figure 4:
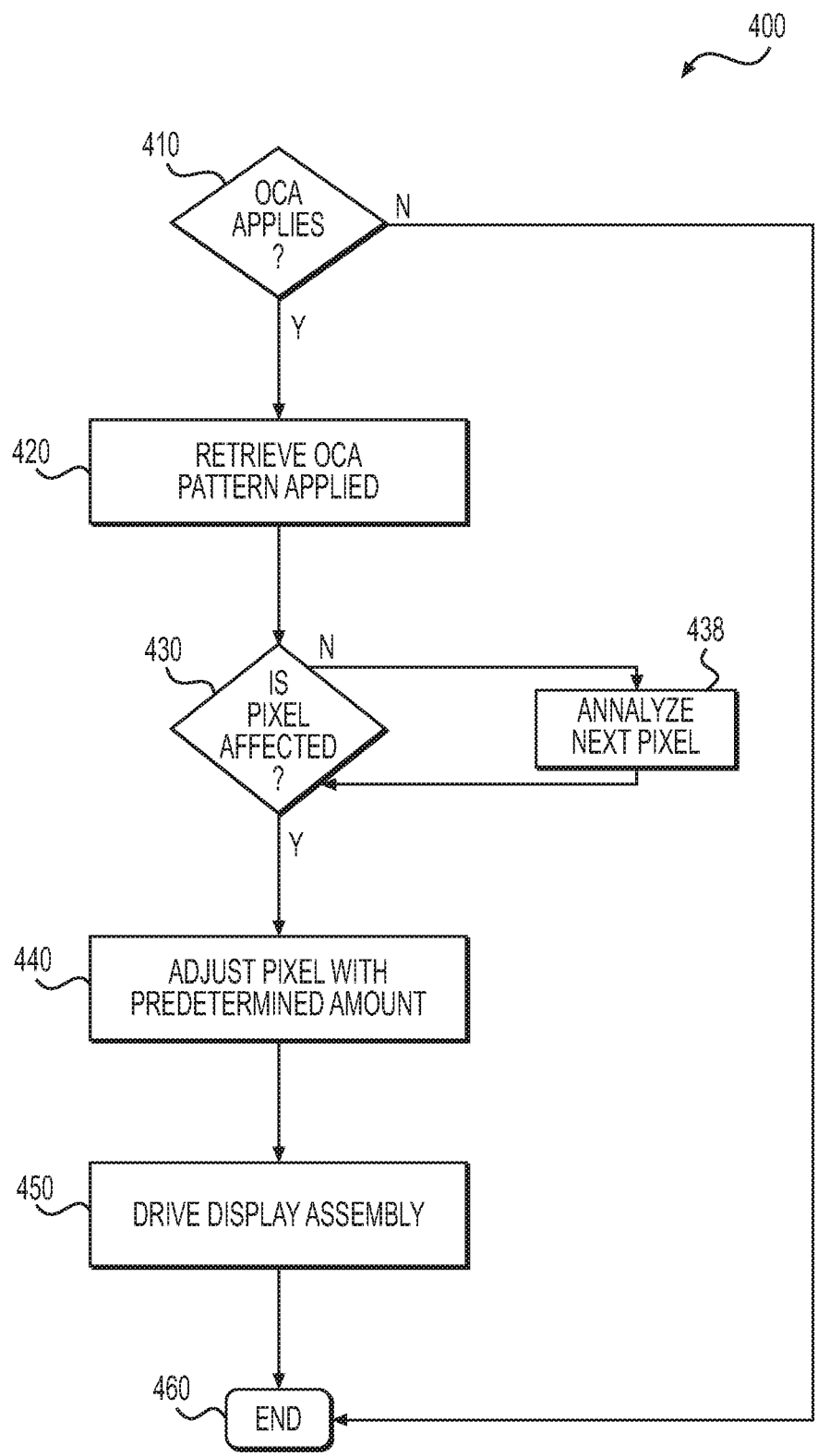
FIG. 4 illustrates an example method for implementing the system shown in FIG. 1.

System 100 employs a formula adjuster 105, which will be explained in greater detail below, to transform the display data 101 in a manner so that the information may be displayed on different lenses that make up the display assembly 150. FIG. 4 illustrates an example method 400 used in an implementation of system 100, with the method 400 ensuring that the driving of the separated image data is performed in a manner to provide a seamless appearance to a viewer of the display assembly 150.

System 100 produces output data for each respective lens (and corresponding display systems associate with each of the respective lens) employed by the display assembly 150. While the number of lenses shown in this disclosure may be two, other number of lenses may be implemented. Thus, system 100 produces lens output data, lens data 1 (110), . . . lens data X (120). Each of the lens output data items may be individual produced with the formula adjuster 105 concepts discussed with method 400. Each lens may have a specific display driver associated with the electronics employed to selectively illuminate and control the various pixels associated with the respective lens.

As shown in FIG. 1, a display driver 1 (130) is coupled to a first lens, while a display driver X (140) is coupled to a second lens. The range of 1 . . . X is merely exemplary, with a number of lens greater than two being selected by an implementer of display assembly 150 and system 100.

Each display driver produces specific pixel data associated with the lens in which the display driver is associated. The data is produced in an (X,Y) coordinate fashion, which indicates that an array of data associated with the horizontal and vertical elements of the respective lens is contained in the respective data file—(X,Y) info 1 (111) . . . (X,Y) info X (112).

Based on the data propagated from the various display drivers, an image is produced on the display assembly 150. Examples of the display assembly 150 according to an exemplary embodiment contained herein is described in greater detail in FIGS. 2(a)-(c).

Figure 2A:
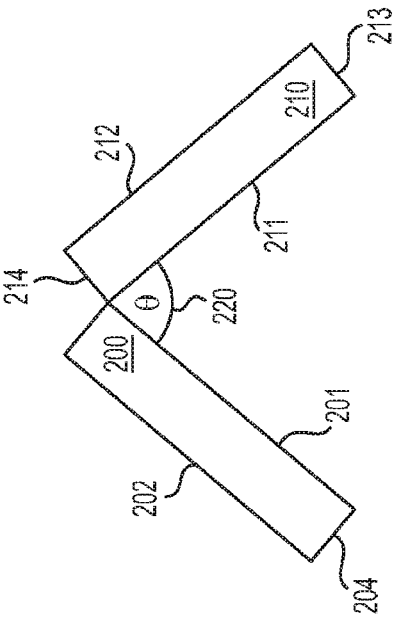
FIGS. 2(a)-(c) illustrate an example of a display assembly according to an exemplary embodiment.
Figure 2B:
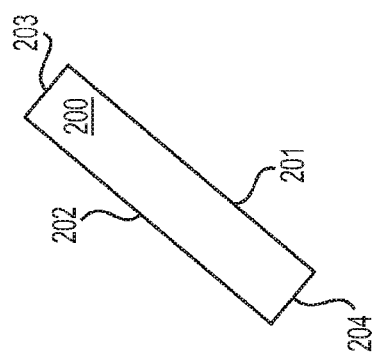
Figure 2C:
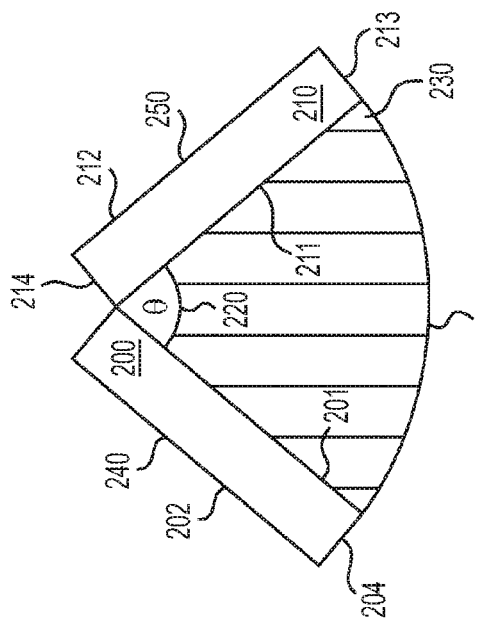
Figure 3:
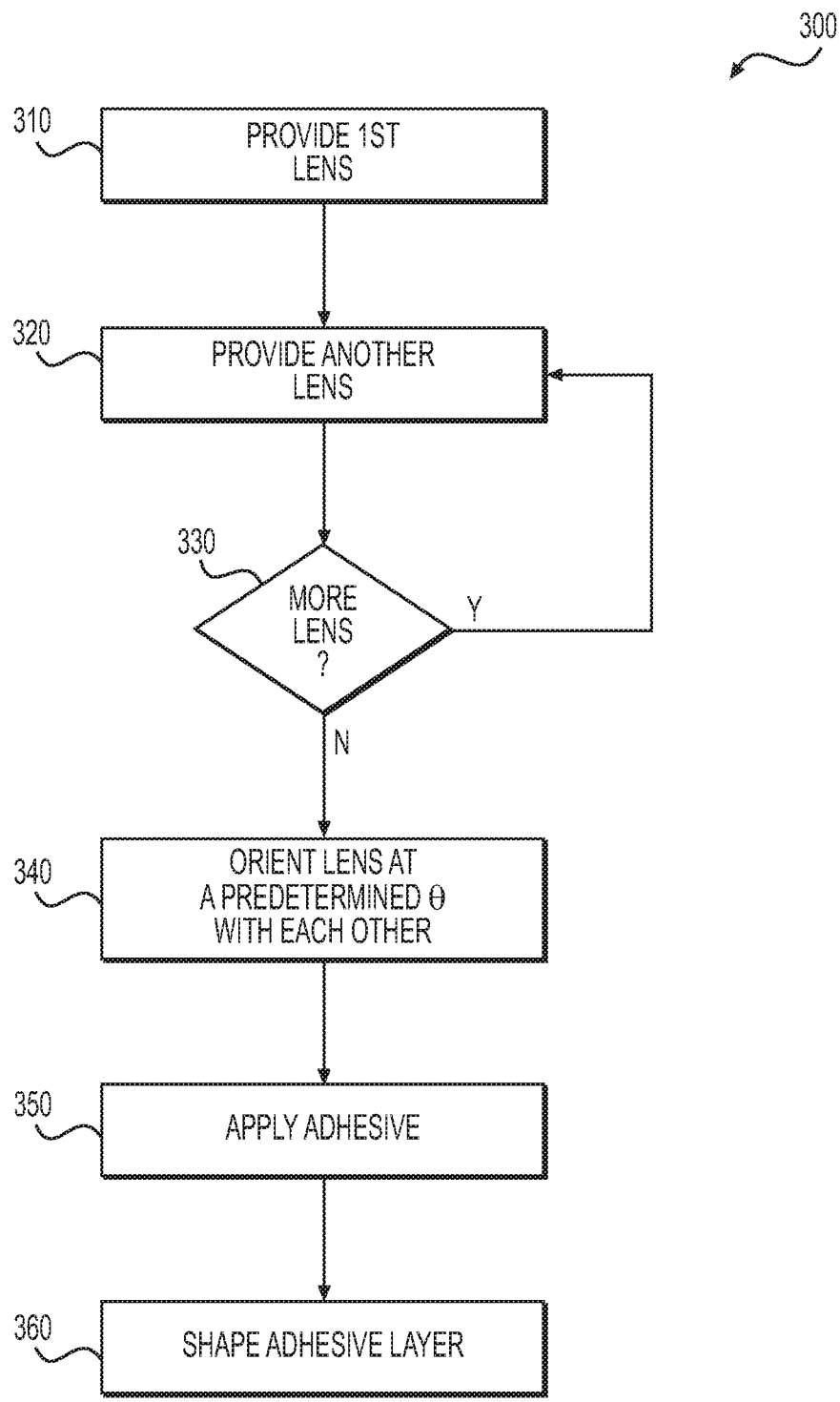
FIG. 3 illustrates an example of a method for assembling a display assembly according to an exemplary embodiment.

FIG. 3 illustrates a method 300 for assembling the display assembly 150 shown in FIGS. 2(a)-(c). In FIG. 2(a), a first lens 200 is provided (operation 310). Lens 200 may be any lens employed to provide digital content. The lens includes four surfaces, 201-204. The surface 201 faces a viewer of the display assembly, while the opposing surface 202 is not viewed by the viewer and may be obscured from sight. Electronic circuitry employed to communicate digital information to be displayed via the lens may be situated behind surface 202.

In FIG. 2(b), a second lens 210 is provided (operation 320). The second lens 210 has surfaces 211-214 that correspond respectively to surfaces 201-204. As explained above, in one example, the display assembly 150 may include just two lenses. Alternatively, more lens may be added (see operation 330). Thus, a number of lenses may be selectively chosen depending on an implementation selected.

In operation 340, an orientation angle 220 is selected between the lenses. The angle 220, as shown is provided in such a manner so that the lenses surface 201 and 211 face each other.

In operation 350, an optical clear adhesive (OCA) layer 230 (or liquid OCA) is applied. This application bonds the various lens provided above together.

As shown in FIG. 2(c), an adhesive layer 230 is formed in the space between the lenses 200 and 210. The adhesive layer 230 is transparent and allows light emanating from lenses 200 and 210 (via surfaces 201 and 211 respectively) to propagate via the adhesive layer 230 to a viewer of the display assembly 150.

With the display assembly 150 shown above, splitting a display image into multiple screens is used. However, because the lenses are oriented at each other with angle 220, the image appears in a disjointed and non-seamless manner. As shown in FIG. 6(a), the image on the display assembly 150 will be affected by the angle 220. The viewer will see the image, but it will be disjointed because the various image portions will be shown at an angle.

FIG. 4 illustrates a method 400 for adjusting a display driver to compensate for a display assembly 150 shown in FIG. 2(c). The method 400 may be incorporated in system 100.

In operation 410, a determination is made as to whether an adhesive layer is applied. If the adhesive layer is applied, the method 400 proceeds to operation 420. If no, the method 400 proceeds to end 460.

In operation 420, the amount of adhesive, the shape, and various other aspects of the adhesive is retrieved. FIG. 5 illustrates various elements of adhesive layer 230 including to the elements already shown (such as the angle 220 and the shape 231) that may be retrieved in operation 420. As shown, the various elements retrieved in addition to the angle 220 and the shape 231 are the length to the surface 510 (for each specific pixel), the width of the display 520, and the specific material used 500.

In operation 430, an iterative step (as shown in operation 435) is performed. Each pixel is analyzed based on all the elements analyzed in operation 420 to determine whether the pixel should be driven in a different manner (i.e. with a different amount of illumination or color).

The function to drive each pixel in a different manner may be based on one, some, or all of the following:
1) lens technology used;
2) angle 220;
3) shape 231;
4) length from surface 510;
5) width 520; and
6) material used 500.

The above method is performed on a pixel by pixel method. However, a digital signal processing (DSP) technique may also be used to ensure that the images sent to each lens is done so that the viewer sees a seamless image after the adhesive layer is applied.

In operation 440, each pixel is adjusted based on the analysis in operation 440. Each pixel may be adjusted on the respective lens to provide a seamless appearance. The display drivers (e.g. those shown in FIG. 1), may also be adjusted accordingly based on the application of system 100.

FIGS. 6(a) and (b) illustrate an example of the display assembly 150 implemented without system 100 and with system 100, respectively. As shown, display data 101 is communicated to the display assemblies 150 employing the aspects shown in FIG. 1. The display data 101 is split and various portions are individually communicated to the various lenses included in the display assembly 150. In FIG. 6(a), the resultant image on the display assembly 150 is shown in a non-seamless manner. Essentially, the image is shown with the discontinuity of two lens shown. This discontinuity is created by a variety of factors, including, but not limited to, the crease between the lenses, the angle, and the mere fact that two lenses are used.

On the contrary, in FIG. 6(b), because the elements discussed with system 100 are incorporated, the image now appears seamless. Thus, a viewer may affectively gaze upon display assembly 150 and not notice 1) the fact that the lenses are at an angle 220 with each other, and 2) that two lenses are used and not one.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A display assembly, comprising:
    a first lens connected to a first display driver, the first lens having a first edge and a second edge;
    a second lens connected to a second display driver, the second lens having a first edge and a second edge, the second lens forming an angle with the first lens by directly abutting the second edge of the first lens and the first edge of the second lens; and
    an adhesive layer applied to the first lens and the second lens,
    the adhesive layer forming a non-linear surface,
    the non-linear surface beginning at the first edge of the first lens and ending at the second edge of the second lens, and
    the non-linear surface being only disposed on a visible portion of the first and second lenses,
    wherein the adhesive layer forms a partial cylindrical-shaped object, and
    wherein a circular surface of the partial cylindrical-shaped object is formed by an outwardly curved surface forming from the first edge of the first lens to the second edge of the second lens.

2. The assembly according to claim 1, wherein the first display driver and the second display driver are electrically coupled to a source, the source being configured to generate display data via both the first display driver and the second display driver.

3. The assembly according to claim 2, wherein display data is further configured to be split into a first portion communicated to the first display driver, and a second portion communicated to the second display driver.

4. The assembly according to claim 1, wherein the adhesive layer is an optically clear adhesive (OCA).

5. The assembly according to claim 4, wherein the OCA is a liquid optical clear adhesive.

6. The assembly according to claim 4, wherein the OCA is a provided with a predefined shape.

7. The assembly according to claim 6, wherein the predefined shape is a curve.

8. The assembly according to claim 7, wherein the predefined shape is convex.

9. The assembly according to claim 1, wherein the first lens and the second lens are rectangular and flat.

10. A method for providing a seamless display with multiple lenses, each of the multiple lenses being associated with a respective display, comprising:
    providing a first lens associated with a first display, the first lens having a first edge and a second edge;
    providing a second lens associated with a second display, the second lens having a first edge and a second edge;
    orientating the first lens and the second lens with each other lens by directly abutting the second edge of the first lens and the first edge of the second lens; and
    providing an adhesive layer on both the first lens and the second lens,
    the adhesive layer forming a non-linear surface,
    the non-linear surface beginning at the first edge of the first lens and ending at the second edge of the second lens, and
    the non-linear surface being only disposed on a visible portion of the first and second lenses,
    wherein the adhesive layer forms a partial cylindrical-shaped object, and
    wherein a circular surface of the partial cylindrical-shaped object is formed by an outwardly curved surface forming from the first edge of the first lens to the second edge of the second lens.

11. The method according to claim 10, wherein the adhesive layer is providing a predetermined shape on a surface opposing a viewer of the seamless display.

12. The assembly according to claim 1, wherein the partial cylindrical-shaped object is at most a semi-cylinder.

\* \* \* \* \*